United States Patent
Murasaki et al.

(10) Patent No.: US 6,325,621 B1
(45) Date of Patent: Dec. 4, 2001

(54) FURNACE OBSERVATION APPARATUS

(75) Inventors: Masahiko Murasaki, Kanagawa; Sumio Kaieda, Hyogo, both of (JP)

(73) Assignee: Asahi Glass Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/544,294

(22) Filed: Apr. 6, 2000

(30) Foreign Application Priority Data

Apr. 6, 1999 (JP) .................................................. 11-098636

(51) Int. Cl.[7] ...................................................... F27D 21/02
(52) U.S. Cl. .............................. 432/250; 432/32; 348/83; 99/341
(58) Field of Search ............................. 432/32, 250, 266; 99/341; 110/185, 336; 362/3, 373; 356/376, 379; 374/124, 137; 348/83

(56) References Cited

U.S. PATENT DOCUMENTS

| | | | |
|---|---|---|---|
| 3,021,386 | * | 2/1962 | Clark ........................................ 348/83 |
| 3,609,236 | | 9/1971 | Heilman . |
| 4,730,911 | * | 3/1988 | Wood et al. ........................... 350/575 |
| 4,833,303 | * | 5/1989 | Mellen, Sr. ............................ 432/250 |
| 5,139,412 | | 8/1992 | Kychakoff et al. . |
| 5,162,906 | * | 11/1992 | Yorita et al. ............................ 348/83 |
| 5,777,668 | * | 7/1998 | Amano ..................................... 348/83 |
| 6,069,652 | * | 5/2000 | Eversole et al. ........................ 348/83 |

FOREIGN PATENT DOCUMENTS

| | | |
|---|---|---|
| 2 102 259 | 4/1972 | (FR) . |
| 9-307795 | 11/1997 | (JP) . |

OTHER PUBLICATIONS

Patent Abstracts of Japan, vol. 1998, No. 2, Jan. 30, 1998, JP 09–261516, Oct. 3, 1997.

* cited by examiner

*Primary Examiner*—Gregory Wilson
(74) *Attorney, Agent, or Firm*—Oblon, Spivak, McClelland, Maier & Neustadt, P.C.

(57) ABSTRACT

A furnace observation apparatus for observing the state in a high temperature atmosphere furnace, which comprises an optical member to be inserted and disposed in a through-hole formed in a furnace wall of the furnace, made of a material having a softening point higher than the furnace temperature and being capable of transmitting an image observed in the furnace, and a photographing means to be disposed outside of the furnace, for photographing the image observed in the furnace, transmitted from the optical member.

7 Claims, 3 Drawing Sheets

FURNACE OBSERVATION APPARATUS

BACKGROUND OF THE INVENTION

1. Field of the Invention

The present invention relates to a furnace observation apparatus for observing the state of a high temperature atmosphere furnace such as a glass melting furnace or an incinerator.

2. Discussion of the Background

JP-A-9-307795 discloses a furnace observation apparatus comprising a cylindrical member to be inserted in a furnace and a CCD camera attached to the forward end of the cylindrical member, wherein the cylindrical member has a multi-cylinder structure comprising a plurality of cylinders, and it is constructed to photograph the state in the high temperature atmosphere furnace while cooling the CCD camera by supplying a cooling liquid or a cooling gas to a space between such cylinders.

However, such a conventional furnace observation apparatus has had a drawback that the structure of the apparatus tends to be complex, since the cylindrical member is constructed to have a multi cylinder structure to let the cylindrical member have a cooling function.

Further, such a furnace observation apparatus has a structure in which the cooling air used for cooling the CCD camera will leak into the furnace, whereby $NO_x$ is likely to be formed in the furnace by the leaked air. Further, it has a drawback that the furnace is cooled by the leaked air. Especially, in the case of a glass melting furnace, if $NO_x$ is formed in the furnace or if the temperature in the furnace changes, such will cause deterioration of the quality of glass, or such is undesirable from the viewpoint of the environmental safety.

SUMMARY OF THE INVENTION

The present invention has been made under these circumstances, and it is an object of the present invention to provide a furnace observation apparatus, whereby the state in a high temperature furnace can be observed with a simple structure without necessity to provide a cooling function to cool the optical member.

To accomplish the above object, the present invention provides a furnace observation apparatus for observing the state in a high temperature atmosphere furnace, which comprises an optical member to be inserted and disposed in a through-hole formed in a furnace wall of the furnace, made of a material having a softening point higher than the furnace temperature and being capable of transmitting an image observed in the furnace, and a photographing means to be disposed outside of the furnace, for photographing the image observed in the furnace, transmitted from the optical member.

According to the present invention, an optical member made of a material having a softening point higher than the furnace temperature and being capable of transmitting an image observed in the furnace, is disposed in a through-hole formed in a furnace wall, and the image observed in the furnace which is transmitted by this optical member, is photographed by a photographing means installed outside of the furnace. Thus, the state in the high temperature furnace can be observed with such a simple structure without necessity to provide a cooling function to cool the optical member.

Further, according to the present invention, the optical member of the above furnace observation apparatus is preferably made of quartz glass. If the optical member is made of quartz glass, it will have high heat resistance and can be used without problem even in a furnace with a high temperature atmosphere.

Further, according to the present invention, the furnace observation apparatus is preferably provided with a cooling means for cooling the photographing means. Thus, it is possible to prevent by the cooling means a failure of the photographing means due to the heat of the furnace.

BRIEF DESCRIPTION OF THE DRAWINGS

Now, preferred embodiment of the furnace observation apparatus of the present invention will be described with reference to the accompanying drawings.

In the accompanying drawings.

DESCRIPTION OF THE EMBODIMENT

Figure 1:
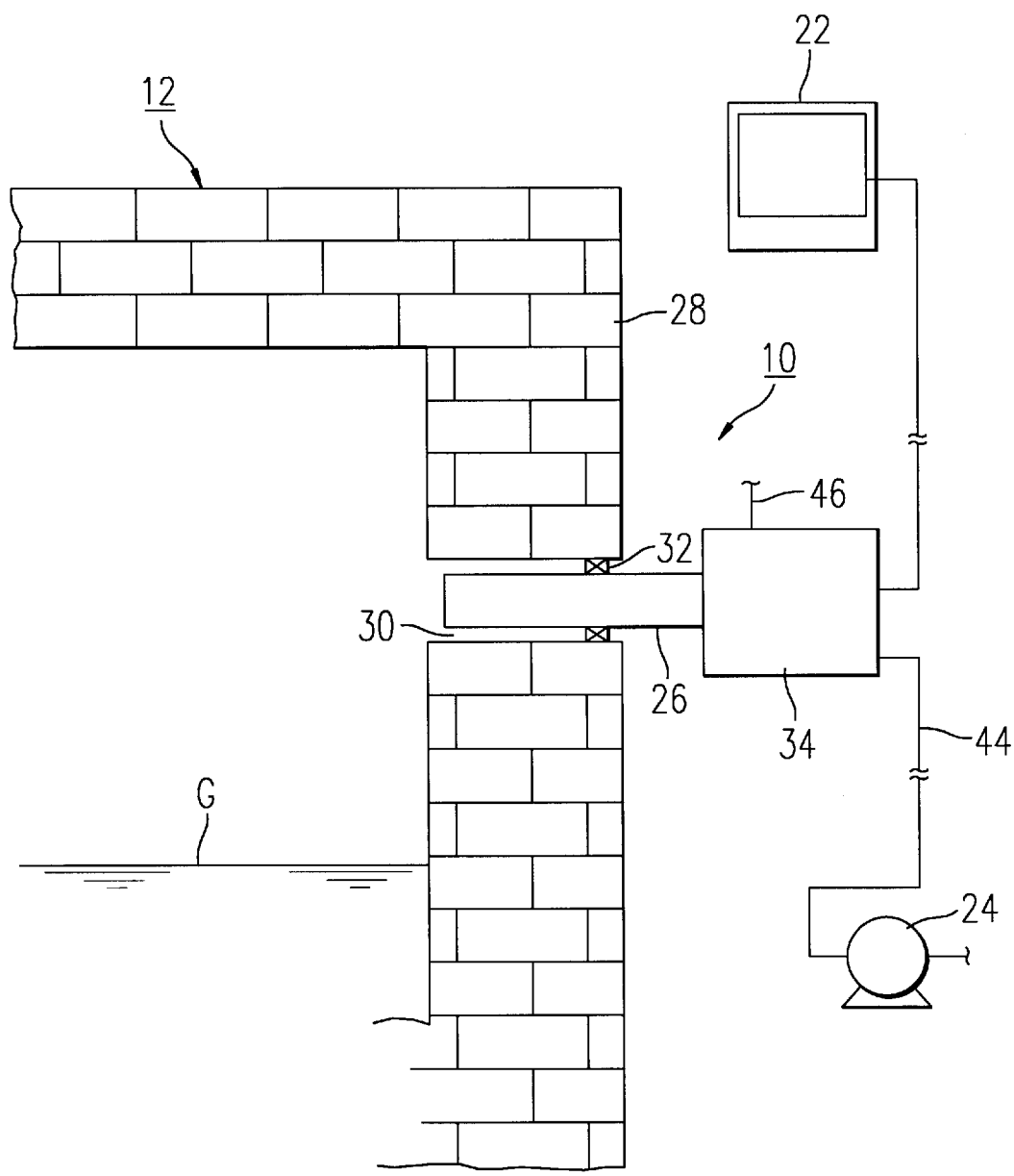
FIG. 1 is a cross-sectional view of a principal portion of a glass melting furnace, to which the furnace observation apparatus according to the present invention is applied.

FIG. 1 is a cross-sectional view of a principal portion illustrating a state in which a furnace observation apparatus 10 according to one embodiment of the present invention is installed on a glass melting furnace 12. The furnace observation apparatus 10 shown in the Figure is an observation apparatus for observing the state of the surface of the molten glass C melted by a glass melting furnace 12, and as shown in FIG. 2, it comprises an optical member 14 as a light guide formed in a rod shape, a condensing lens 16, a beam attenuating filter 18, a CCD camera 20, a monitor 22 and an air cooling device 24.

Figure 2:
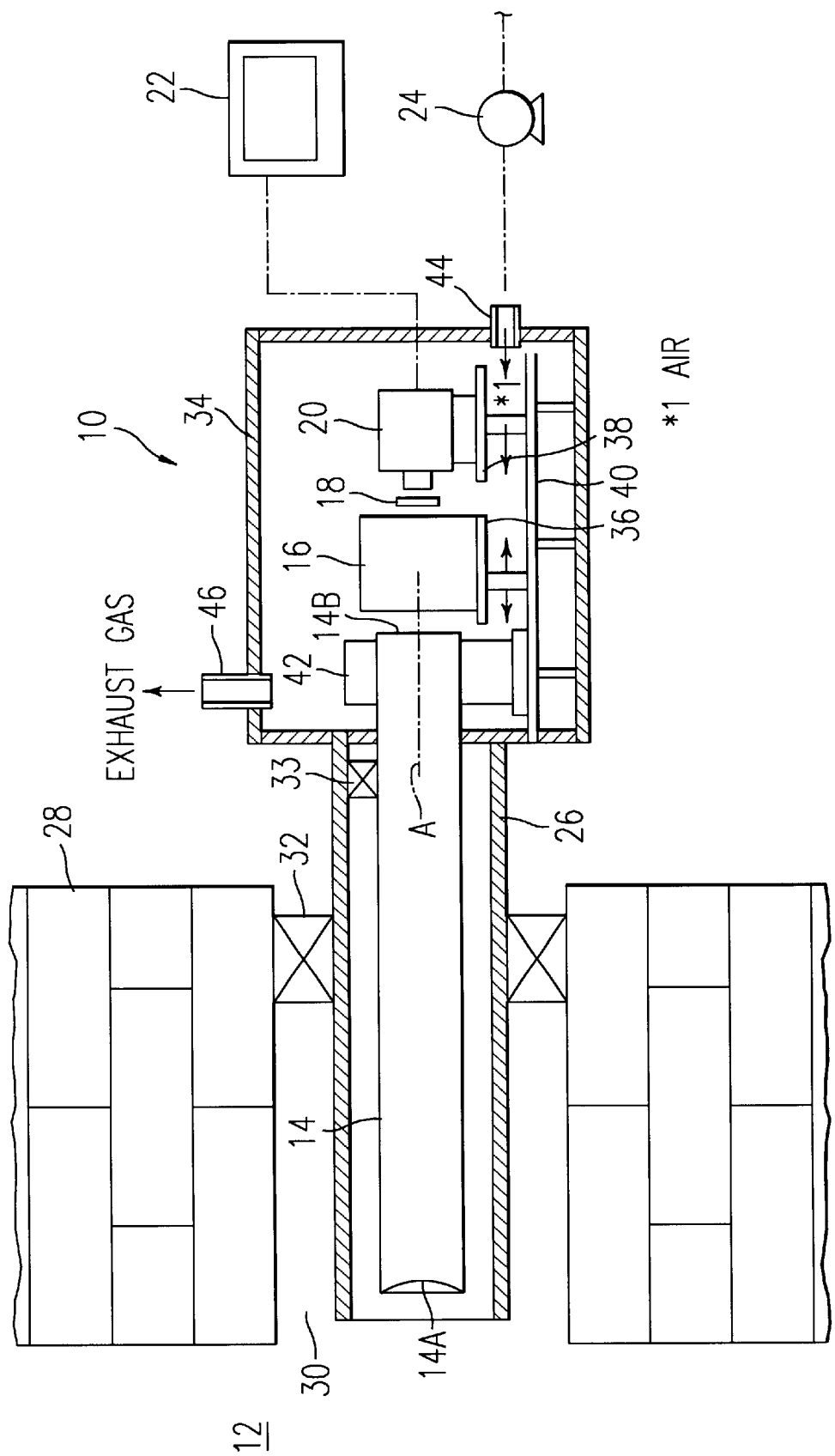
FIG. 2 illustrates the structure of the furnace observation apparatus shown in FIG. 1.
Figure 3:
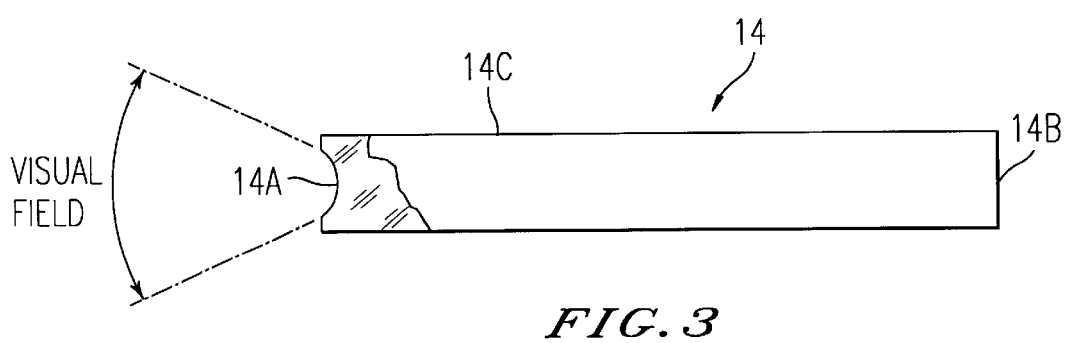
FIG. 3 is a side view of the optical member of the furnace observation apparatus shown in FIG. 1.

The optical member 14 is made of a material having a softening point higher than the furnace temperature, such as quartz glass, and the forward end surface thereof constitutes an objective lens section 14A formed in a concave shape as shown in FIGS. 2 and 3, and the rear end surface thereof constitutes an eye lens section 14S. Further, the circumferential surface 14C of the optical member 14 is delustered, whereby the light of the observed image taken in from the above object lens section 14A will be totally reflected by the circumferential surface of the optical member and transmitted to the eye lens section 14S with little leakage from the optical member 14.

As shown in FIG. 2, the optical member 14 is inserted in a cylindrical casing 26, so that the circumference in the axial direction of the rod-shaped optical member is not directly exposed to the atmosphere in the furnace. The casing 26 for the optical member is made of a material having heat resistance such as silicon carbide or alumina (i.e. a refractory material). The optical member 14 is inserted and disposed in a through-hole 30 formed in a furnace wall 28, as inserted in the above casing 26. Further, the position of the above casing 26 to be inserted in the through-hole 30 will be set so that the object lens section 14A of the optical member 14 will be located at a position suitable for observation of the surface of the molten glass G and the eye lens section 14B is located at a position outside of the furnace. After the position for insertion is so set, the casing 26 will be fixed in the through-hole 30 via a heat resistance sealing material 32 such as a castable brick, a brick or a ceramic wool. By the sealing material 32, the interior and the exterior of the furnace is partitioned to prevent lowering of the temperature in the furnace. Further, by means of a sealing agent 33 such as ceramic wool, the optical member 14 is fixed to the casing 26.

At the rear side (upper right-hand side in FIG. 2) of the eye lens section 14B of the optical member 14, a photographing apparatus (which corresponds to the photographing means) comprising a condensing lens 16, a beam attenuating filter 18 and a CCD camera 20, is disposed. This photographing apparatus is disposed in a box type casing 34 for the photographing apparatus.

The operation of the photographing apparatus is as follows. Firstly, the light of a observed image transmitted to the eye lens portion 14B of the optical member 14 will be condensed by the condensing lens 16, and the condensed light will be attenuated by the beam attenuating filter 18 to a predetermined brightness. This attenuated light of the observed image will form an image on a CCD light receiving screen of the CCI) camera, whereby the surface of molten glass G will be photographed with a predetermined brightness by the CCD camera 20. This photographed image of the glass surface will be displayed on a monitor 22. The monitor 22 is installed in an operation room (not shown) for remote control of the glass melting furnace 12 and will be watched by an operator. The condensing lens 16 and the CCD camera 20 are mounted and secured on the respective supports 36 and 38. These supports 36 and 38 are provided on a table 40 installed in the casing 34 so that they are movable back and forth in the direction of the light axis A of the optical member 14. Thus, the positions of the condensing lens 16 and the CCD camera 20 will be set by moving the above mentioned supports 36 and 38 back and forth in the direction of the light axis A. The beam attenuating filter 18 may be attached on the condensing lens 16 side or on the CCD camera 20 side. Further, on the above table 40, a support member 42 is installed which supports the eye lens section 14B of the optical member 14.

To the above casing 34, an air cooling apparatus 24 is connected via a pipe 44. The air cooling apparatus 24 comprises a blower for sucking open air, and when this blower is operated, open air sucked by the blower will be supplied via a pipe 44 into the casing 34. The pipe 44 is attached at a lower portion of the casing 34, and an exhaust gas pipe 46 is attached at an upper portion of the casing 34. Accordingly, the open air supplied into the casing 34 will be an ascending stream, will pass through the photographing apparatus and will be discharged to the exterior from the exhaust gas pipe 46. By the stream of this open air, the photographing apparatus which is not heat resistant, will be efficiently cooled.

Now, the operation of the furnace observation apparatus 10 having the above described construction, will be described.

As shown in FIG. 1, if the casing 26 of the furnace observation apparatus 10 is inserted and disposed in the through-hole 30 of the furnace wall 28, the observed image of the surface of molten glass G will be transmitted from the objective lens section 14A of the optical member 14 of FIG. 2 to the eye lens section 14B. Then, the transmitted observed image will be photographed by the CCD camera 20 of the photographing apparatus disposed outside of the furnace and will be displayed on the monitor 22.

In this embodiment, the optical member 14 is made of quartz glass having a softening point higher than the furnace temperature and being optically homogeneous, specifically quartz glass such as molten quartz glass or synthetic quartz glass having a softening point of at least 1,500° C., particularly preferably at least 1,650° C., whereby it will be unnecessary to provide a cooling apparatus for cooling the optical member 14. Thus, by the furnace observation apparatus 10 of this embodiment, simply by disposing the optical member 14 in the throughhole of the furnace wall 28, the surface of molten glass G can be photographed, whereby the structure will be simplified as compared with a conventional furnace observation apparatus.

Further, in this embodiment, the interior of the casing for the photographing apparatus such as the CCD camera 20 having no heat resistance, is cooled by an air cooling apparatus 24, whereby a failure of the photographing apparatus due to the radiation heat of the furnace can be prevented.

In this embodiment, the optical member 14 is made of quartz glass, but it is not limited thereto and may be made of any material which has a softening point higher than the furnace temperature and which is useful as an optical system.

In this embodiment, the furnace observation apparatus 10 is applied to a glass melting furnace 12. However, the application is not limited thereto, and the furnace observation apparatus 10 of this embodiment can be applied also to other various furnaces such as incinerators.

As described in the foregoing, according to the present invention, the furnace observation apparatus is constructed so that the optical member made of a material having a softening point higher than the furnace temperature and capable of transmitting an image observed in the furnace, is disposed through a through-hole of a furnace wall, so that the image observed in the furnace which is transmitted from the object lens section to the eye lens section of the optical member, is photographed by a photographing means disposed outside of the furnace, whereby the state in the furnace with a high temperature atmosphere can be observed with a simple structure without necessity to provide a cooling function to cool the optical member itself.

Further, according to the present invention, the optical member is preferably made of quartz glass having a high softening point, and it has high heat resistance and can sufficiently be used even in a furnace with a high temperature atmosphere.

Furthermore, according to the present invention, the photographing means having no heat resistance is preferably cooled by a cooling means, whereby it is possible to prevent a failure of the photographing means due to the heat of the furnace.

What is claimed is:

1. A furnace observation apparatus configured to observe an object in a high temperature atmospheric furnace, comprising:

a rod-shaped optical member disposed in a through-hole formed in a furnace wall of the furnace, made of a material having a softening point temperature higher than the furnace temperature, and configured to transmit an image of the object in the furnace; and a photographing device disposed outside of the furnace and configured to photograph the image of the object in the furnace via transmission through the optical member.

2. The furnace observation apparatus according to claim 1, wherein the optical member is made of quartz glass.

3. The furnace observation apparatus according to claim 1, further comprising:

a cooling, device configured to cool the photographing device.

4. The furnace observation apparatus according to claim 1, wherein the casing is made of silicon carbide.

5. The furnace observation apparatus according to claim 1, wherein the casing is made of alumina.

6. The furnace observation apparatus according to claim 1, wherein said optical member includes a delustered circumferential surface.

7. The furnace observation apparatus according to claim 1, further comprising:

a casing made of a refractory material, wherein the optical member is inserted into the casing.

* * * * *